United States Patent
Yamamoto et al.

(10) Patent No.: US 10,486,280 B2
(45) Date of Patent: Nov. 26, 2019

(54) ELECTRIC WORKING MACHINE, AND METHOD FOR DETERMINING LOAD-IMPOSED STATE OF ELECTRIC WORKING MACHINE

(71) Applicant: MAKITA CORPORATION, Anjo-shi, Aichi (JP)

(72) Inventors: Hirokatsu Yamamoto, Anjo (JP); Ryo Umemoto, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 68 days.

(21) Appl. No.: 15/975,904

(22) Filed: May 10, 2018

(65) Prior Publication Data

US 2018/0339385 A1    Nov. 29, 2018

(30) Foreign Application Priority Data

May 26, 2017  (JP) ................................. 2017-104495

(51) Int. Cl.
| | |
|---|---|
| *B23Q 17/22* | (2006.01) |
| *B25D 16/00* | (2006.01) |
| *G01H 1/00* | (2006.01) |
| *B25D 17/00* | (2006.01) |
| *H02P 6/16* | (2016.01) |

(52) U.S. Cl.
CPC ............. *B23Q 17/22* (2013.01); *B25D 16/00* (2013.01); *B25D 17/00* (2013.01); *G01H 1/003* (2013.01); *H02P 6/16* (2013.01); *B25D 2250/201* (2013.01); *B25D 2250/221* (2013.01)

(58) Field of Classification Search
CPC ........ B25D 16/00; B25D 17/00; G01H 1/003; H02P 6/16; B23Q 17/22

USPC ......................................................... 318/494
See application file for complete search history.

(56) References Cited

U.S. PATENT DOCUMENTS

| | | | |
|---|---|---|---|
| 2014/0196920 A1 | 7/2014 | Wirnitzer et al. | |
| 2015/0158170 A1 | 6/2015 | Nitsche et al. | |
| 2018/0099399 A1* | 4/2018 | Sunabe | B25D 16/00 |
| 2018/0272511 A1* | 9/2018 | Sako | B25B 23/1405 |

FOREIGN PATENT DOCUMENTS

| | | |
|---|---|---|
| DE | 10 2012 208855 A1 | 11/2013 |
| DE | 10 2013 200602 A1 | 7/2014 |
| JP | 2004-255542 A | 9/2004 |
| JP | 2004255542 A * | 9/2004 |

OTHER PUBLICATIONS

Oct. 29, 2018 Search Report issued in European Patent Application No. 18172249.7.

* cited by examiner

Primary Examiner — Jorge L Carrasquillo
(74) Attorney, Agent, or Firm — Oliff PLC

(57) ABSTRACT

An electric working machine in one aspect of the present disclosure includes a motor; an acceleration sensor; a load-determiner; a filter part having a cutoff frequency; and a filter-property setting part. The filter part removes an unwanted signal component from a detection signal from the acceleration sensor based on the cutoff frequency and inputs, to the load-determiner, the detection signal with the unwanted signal component removed. The filter-property setting part changes the cutoff frequency of the filter part such that a cutoff frequency in a high-speed rotation mode is higher than a cutoff frequency in a low-speed rotation mode.

12 Claims, 7 Drawing Sheets

ELECTRIC WORKING MACHINE, AND METHOD FOR DETERMINING LOAD-IMPOSED STATE OF ELECTRIC WORKING MACHINE

CROSS-REFERENCE TO RELATED APPLICATIONS

This application claims the benefit of Japanese Patent Application No. 2017-104495 filed May 26, 2017 in the Japan Patent Office, the disclosure of which is incorporated herein by reference.

BACKGROUND

The present disclosure relates to a technique of driving a motor of an electric working machine in a low-speed rotation mode when the electric working machine is placed in a no-load-imposed state and in a high-speed rotation mode when the electric working machine is placed in a load-imposed state.

A hammering tool disclosed in Japanese Unexamined Patent Application Publication No. 2004-255542 is configured to reduce energy loss by driving a motor of the hammering tool in a low-speed rotation mode when the hammering tool is placed in no-load-imposed state, in which no hammering motion is performed. This hammering tool is also configured to improve its work efficiency by driving the motor in a high-speed rotation mode when the hammering tool is placed in load-imposed state, in which hammering motion is performed.

SUMMARY

Detection of load imposed on the motor is required in a control (hereinafter also referred to as soft-no-load control) which the motor is driven in the low-speed rotation mode to limit the maximum rotational speed of the motor when the hammering tool is placed in the no-load-imposed state as mentioned above.

The aforementioned hammering tool is configured to determine whether the load is imposed on the motor based on the volume of sound or the magnitude of a vibration. If the determination is made based on a vibration that is detectable by an acceleration sensor, such determination is considered easy to make.

However, when the determination is made based on an unprocessed detection signal from the acceleration sensor, unwanted signal components included in the detection signal may hinder accurate determination.

The detection signal corresponds to a vibration generated by hammering or by other causes. The detection signal includes a first signal component required to make the determination, and a second signal component having a frequency different from a frequency of the first signal component. The second signal component corresponds to, for example, a low-frequency vibration generated by a dynamic vibration absorber.

The frequency of the first signal component and the frequency of the second signal component change in accordance with a rotational speed of the motor. Specifically, the frequency of the first signal component and the frequency of the second signal component decrease when the rotational speed is low and increase when the rotational speed is high.

Due to changing rotation modes of the motor, it is difficult to remove the unwanted signal components (such as the second signal component) from the detection signal (in other words, to extract the first signal component from the detection signal) by using a filter. Consequently, it is not possible to achieve highly accurate determination.

Desirably, one aspect of the present disclosure can achieve an accurate determination of a load-imposed state of an electric working machine based on a detection signal from an acceleration sensor without being influenced by changes in a rotation mode of a motor.

An electric working machine in one aspect of the present disclosure includes a motor, an acceleration sensor, a load-determiner, a filter part, and a filter-property setting part.

The acceleration sensor is configured to detect a vibration of the electric working machine and output a detection signal corresponding to the vibration. The load-determiner is configured to determine whether the electric working machine is placed in no-load-imposed state or in load-imposed state based on the detection signal from the acceleration sensor.

The load-determiner is configured to drive the motor in a low-speed rotation mode in response to a determination by the load-determiner that the electric working machine is placed in the no-load-imposed state. The load-determiner is further configured to drive the motor in a high-speed rotation mode in response to a determination by the load-determiner that the electric working machine is placed in the load-imposed state. In other words, the load-determiner is configured to perform the aforementioned soft-no-load control.

The filter part has a cutoff frequency. The filter part is configured to remove, based on the cutoff frequency, an unwanted signal component from the detection signal outputted from the acceleration sensor. The filter part is further configured to input, to the load-determiner, the detection signal with the unwanted signal component removed. The unwanted signal component corresponds to a vibration of the electric working machine unnecessary for a determination by the load-determiner. The filter-property setting part is configured to change the cutoff frequency of the filter part such that the cutoff frequency in the high-speed rotation mode is higher than the cutoff frequency in the low-speed rotation mode.

In the electric working machine having the aforementioned configuration, the cutoff frequency of the filter part is changed in accordance with changes in frequency of various signal components included in the detected signal. The frequency of various signal components changes due to changes in rotational speed of the motor. Consequently, the load-determiner receives a selective input of a signal component that is necessary for determination by the load-determiner.

As a result, accuracy of determination by the load-determiner can be improved, and the soft-no-load control can be successfully performed in this electric working machine.

The filter part may include a high-pass filter. The filter-property setting part may be configured to change the cutoff frequency of the high-pass filter such that the cutoff frequency in the high-speed rotation mode is higher than the cutoff frequency in the low-speed rotation mode.

The filter part may include a low-pass filter. The filter-property setting part may be configured to change the cutoff frequency of the low-pass filter such that the cutoff frequency in the high-speed rotation mode is higher than the cutoff frequency in the low-speed rotation mode.

The filter part may include a low-pass filter, and a high-pass filter. The filter part may be configured as a bandpass filter that causes a passband of the low-pass filter and a passband of the high-pass filter to overlap with each other, or reduces signal transmission loss within a frequency band between a cutoff frequency of the low-pass filter and a cutoff frequency of the high-pass filter.

The filter-property setting part may be configured to change the cutoff frequency of the low-pass filter and/or the cutoff frequency of the high-pass filter such that the cutoff frequency in the high-speed rotation mode is higher than the cutoff frequency in the low-speed rotation mode The detection signal may have a voltage value. The load-determiner may be configured to compare the voltage value of the detection signal, inputted through the filter part, with a threshold value that is predefined. The load-determiner may be configured to determine that the electric working machine is placed in the load-imposed state if the voltage value of the detection signal is greater than the threshold value (in other words, if the voltage value exceeds the threshold value) or otherwise determine that the electric working machine is in the no-load-imposed state.

Such a load-determiner is able to make a determination without changing the threshold value based on the threshold value that is fixed. This consequently helps to simplify the configuration of the electric working machine.

In an alternative case where the load-determiner is configured to change the threshold value between the high-speed rotation mode and the low-speed rotation mode, accuracy of the determination can be improved.

The filter-property setting part may be configured to change the cutoff frequency of the filter part in response to an elapse of a given length of time since a rotation mode of the motor is changed by the load-determiner.

In this case, the cutoff frequency of the filter part is not changed until the rotational mode of the motor is changed and the rotational speed of the motor is stabilized. This helps to reduce erroneous determinations by the load-determiner.

Another aspect of the present disclosure is a method for determining a load-imposed state of an electric working machine. The method may include outputting a detection signal corresponding to a vibration of the electric working machine from an acceleration sensor arranged in the electric working machine.

The method may include removing an unwanted signal component from the detection signal through a filter having a changeable cutoff frequency. The unwanted signal component corresponds to a vibration unnecessary for a determination of the load-imposed state of the electric working machine.

The method may include changing the cutoff frequency of the filter such that the cutoff frequency in a high-speed rotation mode of a motor included in the electric working machine is higher than the cutoff frequency in a low-speed rotation mode of the motor.

The method may include determining whether the electric working machine is placed in the load-imposed state based on the detection signal with the unwanted signal component removed.

Such a method can exerts the same effects as those of the aforementioned electric working machine.

BRIEF DESCRIPTION OF THE DRAWINGS

An example embodiment of the present disclosure will be described hereinafter with reference to the accompanying drawings, in which.

DETAILED DESCRIPTION OF THE PREFERRED EMBODIMENTS

A hammer drill 2 of the present embodiment is configured to perform chipping or drilling on a work piece (e.g., concrete) by a hammering by a tool bit 4, such as a hammer bit, along the longer axis of the tool bit 4 or rotating it about the longer axis.

Figure 1:
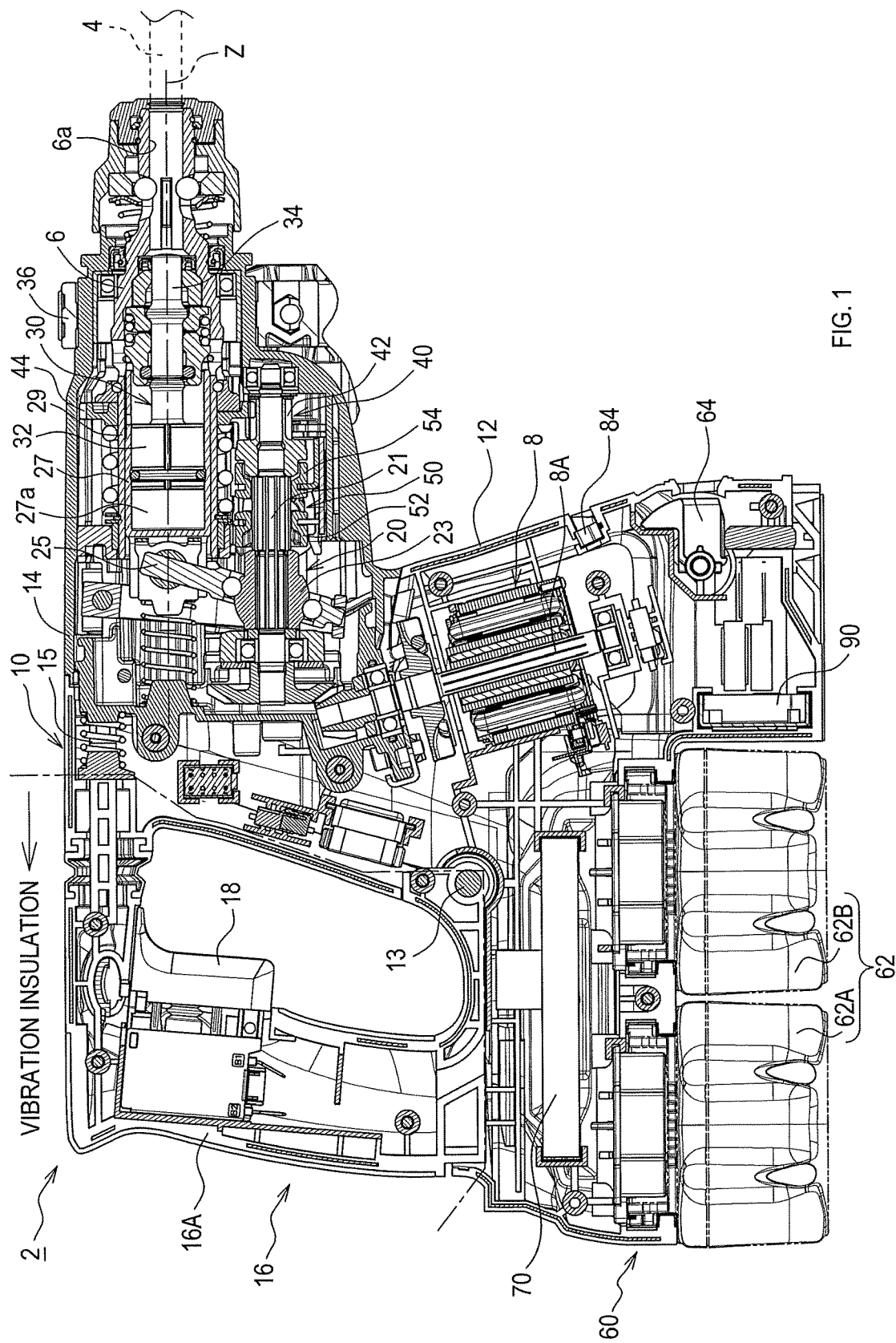
FIG. 1 is a sectional view showing a configuration of a hammer drill according to one embodiment.

As shown in FIG. 1, the hammer drill 2 includes a main body housing 10. The main body housing 10 defines the contour of the hammer drill 2. The tool bit 4 is detachably attached to the tip of the main body housing 10 through a tool holder 6. The tool holder 6 has a cylindrical shape and functions as an output shaft.

The tool bit 4 is inserted in a bit insertion hole 6a in the tool holder 6 and held by the tool holder 6. The tool bit 4 can reciprocate along the longer axis of the tool bit 4 against the tool holder 6, but the rotational motion of the tool bit 4 about the longer axis of the tool bit 4 against the tool holder 6 is restricted.

The main body housing 10 includes a motor housing 12, and a gear-housing 14. The motor housing 12 houses a motor 8. The gear-housing 14 houses a motion converting mechanism 20, a hammering element 30, a rotation transmitting mechanism 40, and a mode switching mechanism 50.

The main body housing 10 is connected to a hand grip 16 on the opposite side to the tool holder 6. The hand grip 16 includes a hold part 16A which is held by an operator.

This hold part 16A extends in a direction orthogonal to the longer axis of the tool bit 4 (i.e., the center axis of the tool holder 6) (the vertical direction in FIG. 1), and a part of the hold part 16A is on the extension (i.e., the longer axis) of the tool bit 4.

A first end of the hold part 16A (i.e., the end adjacent to the longer axis of the tool bit 4) is coupled to the gear-housing 14, and a second end of the hold part 16A (i.e., the end remote from the longer axis of the tool bit 4) is connected to the motor housing 12.

The hand grip 16 is fixed to the motor housing 12 such that it can swing about a support shaft 13. The hand grip 16 and the gear housing 14 are connected to each other through a vibration-insulating spring 15.

The spring 15 absorbs vibrations that occur in the gear housing 14 (i.e., the main body housing 10) due to a hammering operation of the tool bit 4, so that vibrations from the hand grip 16 to the main body housing 10 are absorbed or damped.

In the description below, for convenience of description, the side of the longer axis of the tool bit 4 where the tool bit 4 is disposed is defined as the front side. The side of the longer axis of the tool bit 4 where the hand grip 16 is disposed is defined as the back side. The side of an axis orthogonal to the longer axis of the tool bit 4, along which the hold part 16A extends (i.e., the vertical direction of FIG.

1), where a joint between the hand grip 16 and the gear housing 14 is disposed, is defined as the upper side. The side on which a joint between the hand grip 16 and the motor housing 12 is disposed along the vertical direction of FIG. 1 is defined as the lower side.

Further, in the description below, the Z axis is defined as an axis that extends along the longer axis of the tool bit 4 (i.e., the center axis of the tool holder 6 serving as the output shaft), the Y axis is defined as an axis that is orthogonal to the Z axis and extends in the vertical direction, and the X axis is defined as an axis that is orthogonal to the Z axis and the Y axis and extends in the horizontal direction (i.e., the width direction of the main body housing 10) (see FIG. 2).

In the main body housing 10, the gear housing 14 is disposed on the front side and the motor housing 12 is disposed on the lower side of the gear housing 14. In addition, the hand grip 16 is joined to the back side of the gear housing 14.

Thus, in the hammer drill 2 of this embodiment, the entire main body housing 10, including the gear housing 14 on the front side of the hand grip 16 and the motor housing 12 on the lower side of the gear housing 14, corresponds to a vibrating section. And, the hand grip 16 corresponds to a vibration insulated section.

In the present embodiment, the motor 8 housed in the motor housing 12 is a brushless motor but not limited to a brushless motor in the present disclosure. The motor 8 is disposed such that the rotation shaft 8A of the motor 8 intersects the longer axis of the tool bit 4 (i.e., the Z axis). In other words, the rotation shaft 8A extends in the vertical direction of the hammer drill 2.

Figure 2:
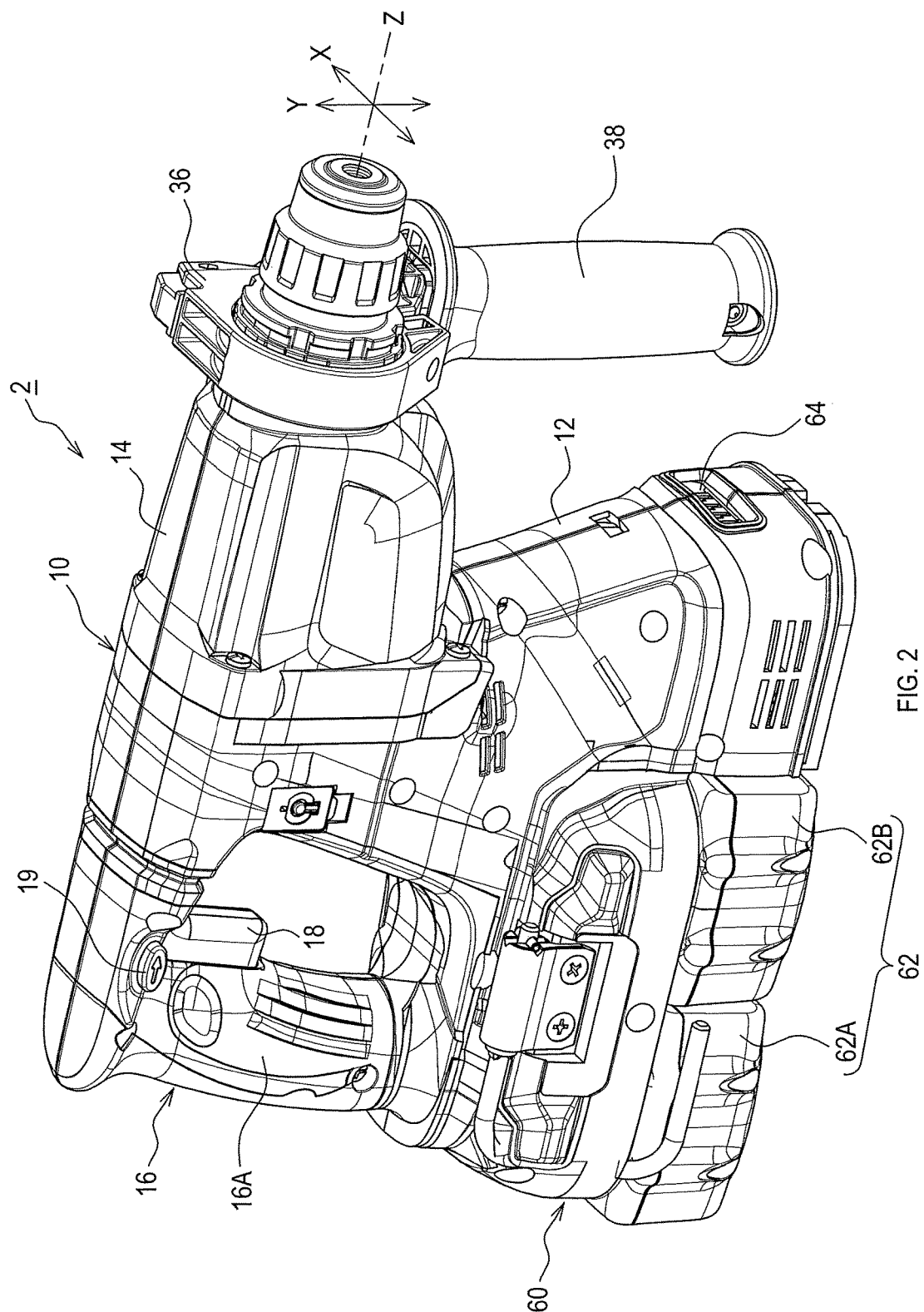
FIG. 2 is a perspective view showing an external appearance of the hammer drill.

As shown in FIG. 2, in the gear housing 14, a holder grip 38 is attached to the outer area of the tip region from which the tool bit 4 protrudes, through an annular fixer member 36. Like the hand grip 16, the holder grip 38 is configured to be gripped by the user. To be specific, the user grips the hand grip 16 with one hand and the holder grip 38 with the other hand, thereby securely holding the hammer drill 2.

An external unit such as a dust collector device may be mounted to the front side of the motor housing 12. To mount the external unit, as shown in FIG. 1 and FIG. 2, a depressed portion is provided on the lower front portion of the motor housing 12 (i.e., in the lower front side of the motor 8) for fixation of the external unit. A connector 64 for electrical connection to the external units is provided in the depressed portion.

Further, a twisted-motion detector 90 is accommodated in a lower portion of the motor housing 12 (i.e., below the motor 8). When the tool bit 4 is rotated for a drilling operation and the tool bit 4 fits in the work piece, the twisted-motion detector 90 detects twisting of the main body housing 10.

The twisted-motion detector 90 of the present embodiment also functions as one example of a load-determiner that determines, based on a vibration from the main body housing 10, whether a load is imposed on the tool bit 4 from the work piece due to a hammering motion of the tool bit 4 (i.e., whether the tool bit 4 is placed in no-load-imposed state or in load-imposed state). The twisted-motion detector 90 is thus directly fixed to the motor housing 12 by a screw for a smoother transmission of the vibration from the main body housing 10.

Battery packs 62A and 62B serving as the power source of the hammer drill 2 are provided on the back side of the container region of the twisted-motion detector 90. The battery packs 62A and 62B are detachably attached to a battery port 60 provided on the lower side of the motor housing 12.

The battery port 60 is located higher than the lower end surface of the container region of the twisted-motion detector 90 (i.e., the bottom surface of the motor housing 12). The lower end surfaces of the battery packs 62A and 62B attached to the battery port 60 are flush with the lower end surface of the container region of the twisted-motion detector 90.

A motor controller 70 is provided on the upper side of the battery port 60 in the motor housing 12 (i.e., the lower side of the hand grip 16). The motor controller 70 controls drive of the motor 8, receiving electric power from the battery packs 62A and 62B.

The rotation of the rotation shaft 8A of the motor 8 is converted to a linear motion by the motion converting mechanism 20 and then transmitted to the hammering element 30. The hammering element 30 generates impact force in the direction along the longer axis of the tool bit 4. The rotation of the rotation shaft 8A is decelerated by the rotation transmitting mechanism 40 and transmitted also to the tool bit 4. In other words, the motor 8 rotatively drives the tool bit 4 about the longer axis. The motor 8 is driven in accordance with the pulling operation on a trigger 18 disposed on the hand grip 16.

As shown in FIG. 1, the motion converting mechanism 20 is disposed on the upper side of the rotation shaft 8A of the motor 8.

The motion converting mechanism 20 includes a countershaft 21, a rotating object 23, a swing member 25, a piston 27, and a cylinder 29. The countershaft 21 is disposed to intersect the rotation shaft 8A and is rotatively driven by the rotation shaft 8A. The rotating object 23 is attached to the countershaft 21. The swing member 25 is swung in the back and forth direction of the hammer drill 2 with the rotation of the countershaft 21 (the rotating object 23). The piston 27 is a bottomed cylindrical member slidably housing a striker 32 which will be described later. The piston 27 reciprocates in the back and forth direction of the hammer drill 2 with the swing of the swing member 25.

The cylinder 29 is integrated with the tool holder 6. The cylinder 29 houses the piston 27 and defines a back region of the tool holder 6.

The hammering element 30 is disposed on the front side of the motion converting mechanism 20 and on the back side of the tool holder 6. The hammering element 30 includes the above-described striker 32 and an impact bolt 34. The striker 32 serves as a hammer and strikes the impact bolt 34 disposed on the front side of the striker 32.

The space in the piston 27 on the back side of the striker 32 defines an air chamber 27a, and the air chamber 27a serves as an air spring. Accordingly, the swing of the swing member 25 in the back and forth direction of the hammer drill 2 causes the piston 27 to reciprocate in the back and forth direction, thereby driving the striker 32.

In other words, the forward motion of the piston 27 causes the striker 32 to move forward by the act of the air spring and strike the impact bolt 34. Accordingly, the impact bolt 34 is moved forward and strikes the tool bit 4. Consequently, the tool bit 4 hammers the work piece.

In addition, the backward motion of the piston 27 moves the striker 32 backward and thereby makes the pressure of the air in the air chamber 27a positive with respect to atmospheric pressure. Further, reaction force generated when the tool bit 4 hammers the work piece also moves the striker 32 and the impact bolt 34 backward.

This causes the striker 32 and the impact bolt 34 to reciprocate in the back and forth direction of the hammer drill 2. The striker 32 and the impact bolt 34, which are driven by the act of the air spring of the air chamber 27a, move in the back and forth direction, following the motion of the piston 27 in the back and forth direction.

The rotation transmitting mechanism 40 is disposed on the front side of the motion converting mechanism 20 and on the lower side of the hammering element 30. The rotation transmitting mechanism 40 includes a gear deceleration mechanism. The gear deceleration mechanism includes gears including a first gear 42 rotating with the countershaft 21 and a second gear 44 to be engaged with the first gear 42.

The second gear 44 is integrated with the tool holder 6 (specifically, the cylinder 29) and transmits the rotation of the first gear 42 to the tool holder 6. Thus, the tool bit 4 held by the tool holder 6 is rotated. The rotation of the rotating shaft 8A of the motor 8 is decelerated by, in addition to the rotation transmitting mechanism 40, a first bevel gear that is provided at the front tip of the rotating shaft 8A and a second bevel gear that is provided at the back tip of the countershaft 21 and engages with the first bevel gear.

The hammer drill 2 of this embodiment has at least three drive modes including a hammer mode, a hammer drill mode, and a drill mode.

In the hammer mode, the tool bit 4 performs a hammering operation along the longer axis, thereby hammering the work piece. In the hammer drill mode, the tool bit 4 performs a rotation operation about the longer axis in addition to a hammering operation, so that the work piece is drilled while being hammered by the tool bit 4. In the drill mode, the tool bit 4 does not perform the hammering operation and only performs the rotation operation, so that the work piece is drilled.

The drive mode is switched or changed by the mode switching mechanism 50. The mode switching mechanism 50 includes rotation transmitting members 52 and 54 shown in FIG. 1 and a switching dial (not shown) provided on the left side surface of the hammer drill 2.

The rotation transmitting members 52 and 54 are generally cylindrical members and movable along the countershaft 21. The rotation transmitting members 52 and 54 are spline-engaged with the countershaft 21 and rotate in cooperation with the countershaft 21.

The rotation transmitting member 52 moving toward the back side of the countershaft 21 is engaged with an engagement groove on the front of the rotating object 23 and transmits the rotation of the motor 8 to the rotating object 23. Consequently, the drive mode of the hammer drill 2 is set to the hammer mode or the hammer drill mode.

The rotation transmitting member 54 moving toward the front side of the countershaft 21 is engaged with the first gear 42 and transmits the rotation of the motor 8 to the first gear 42. Consequently, the drive mode of the hammer drill 2 is set to the hammer drill mode or the drill mode.

The switching dial turned by the user displaces the rotation transmitting members 52 and 54 on the countershaft 21. The switching dial is turned and set to any of the three rotating positions not shown in the drawings, thereby setting the drive mode of the hammer drill 2 to any of the modes: the hammer mode, the hammer drill mode, and the drill mode.

Figure 3:
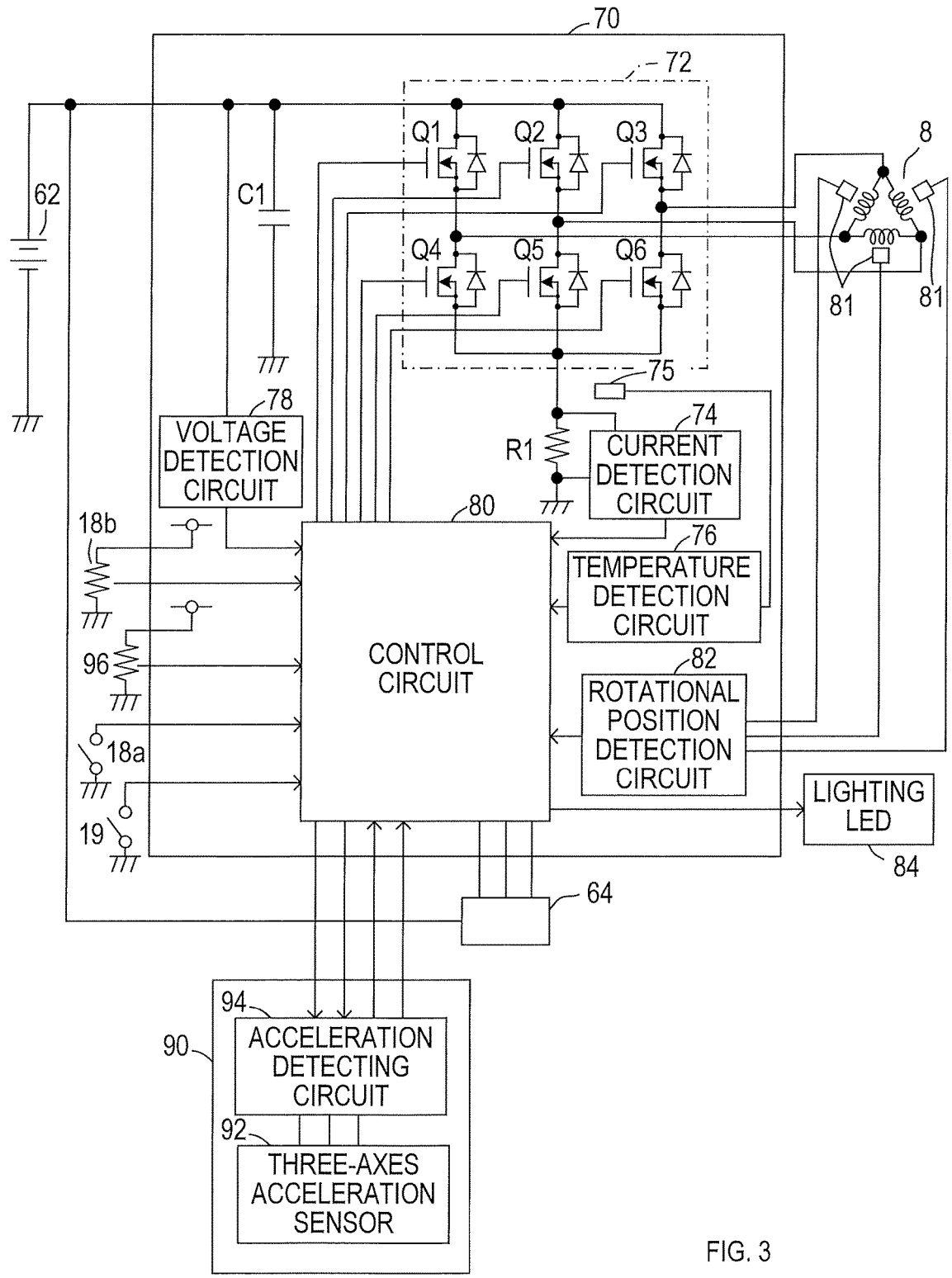
FIG. 3 is a block diagram showing an electrical configuration of a driving system of the hammer drill.

The structures of the motor controller 70 and the twisted-motion detector 90 will now be described with reference to FIG. 3.

The twisted-motion detector 90 includes an acceleration sensor 92 and an acceleration detecting circuit 94. The acceleration sensor 92 and the acceleration detecting circuit 94 are mounted on a common circuit board and contained (or fixed) in a common housing.

The acceleration sensor 92 detects accelerations (more specifically, values of accelerations) along three axes (e.g., the X axis, the Y axis, and the Z axis).

The acceleration detecting circuit 94 processes detection signals from the acceleration sensor 92 to detect twisting of the main body housing 10.

To be specific, the acceleration detecting circuit 94 includes a micro controller unit (MCU) including a CPU, a ROM, and a RAM. The acceleration detecting circuit 94 executes a twisted-motion detecting process, which will be described later, to detect the rotation of the main body housing 10 about the Z axis (i.e., the longer axis of the tool bit 4) at or exceeding a predetermined angle, in accordance with detection signals (specifically, an output based on acceleration along the X axis) from the acceleration sensor 92.

The acceleration detecting circuit 94 further executes an acceleration-load detecting process to detect, using the acceleration sensor 92, vibrations (more specifically, magnitude of vibrations) that occur in the main body housing 10 along the three axes due to a hammering operation of the tool bit 4. In this acceleration-load detecting process, the acceleration detecting circuit 94 detects that a load is imposed on the tool bit 4 (i.e., that the tool bit 4 is placed in the load-imposed state) if a vibration in the main body housing 10 (i.e., acceleration) exceeds a threshold.

The acceleration-load detecting process serves as an example of the load-determiner of the present disclosure, an example of the filter part of the present disclosure, and an example of the filter-property setting part of the present disclosure. The acceleration-load detecting process will be explained later in detail. The motor controller 70 includes a drive circuit 72 and a control circuit 80. The drive circuit 72 and the control circuit 80 are mounted on another common circuit board together with various detection circuits, which will be described later, and contained in another common case.

The drive circuit 72 includes switching devices Q1 to Q6 and is configured to receive electric power from the battery pack 62 (specifically, series-connected battery packs 62A and 62B) and feed current to phase windings in the motor 8 (which is, specifically, a three-phase brushless motor). The switching devices Q1 to Q6 in this embodiment are, for example, field effect transistors (FETs) but not limited to FETs in the present disclosure. The switching devices Q1 to Q6 in another embodiment may be switching devices other than FETs.

The switching devices Q1 to Q3 are each provided as a so-called high side switch between a power source line and one corresponding terminal selected from terminals U, V, and W of the motor 8. The power source line is coupled to a positive terminal of the battery pack 62.

The switching devices Q4 to Q6 are each provided as a so-called low side switch between a ground line and one corresponding terminal selected from the terminals U, V, and W of the motor 8. The ground line is coupled to a negative terminal of the battery pack 62.

A capacitor C1 for damping fluctuations in battery voltage is provided in a power supply path from the battery pack 62 to the drive circuit 72.

Like the acceleration detecting circuit 94, the control circuit 80 includes a not-shown MCU including a CPU, a ROM, and a RAM. The control circuit 80 feeds current to phase windings in the motor 8 by turning on and off the switching devices Q1 to Q6, and rotates the motor 8.

To be specific, the control circuit 80 sets a command rotational speed and rotation direction of the motor 8 in accordance with commands from a trigger switch 18*a*, a speed change commander 18*b*, an upper-limit speed setter 96, and a rotation direction setter 19, and controls drive of the motor 8.

The trigger switch 18*a* is configured to be turned on by pulling the trigger 18 to input a drive command for the motor 8 to the control circuit 80. The speed change commander 18*b* is configured to generate a signal depending on the amount of pulling operation of the trigger 18 (i.e., the operation rate) to vary the command rotational speed depending on this amount of operation.

The upper-limit speed setter 96 includes a not-shown dial. The operational position of the dial is switched by the user of the hammer drill 2 stage by stage. The upper-limit speed setter 96 is configured to set the upper limit of rotational speed of the motor 8 depending on the operational position of the dial.

In the present embodiment, the upper-limit speed setter 96 is configured to be able to set the upper limit of the rotational speed of the motor 8 between a rotational speed higher than a given no-load rotational speed (low rotational speed) and a rotational speed lower than the no-load rotational speed, the no-load rotational speed is set by soft-no-load control.

The soft-no-load control limits the rotational speed of the motor 8 to the no-load rotational speed or lower when (i) the no-load-imposed state is detected in the acceleration-load detecting process executed in the acceleration detecting circuit 94, and (ii) no-load drive condition of the motor 8 is detected based on current flowing through the motor 8. The soft-no-load control is achieved in a control process executed by the control circuit 80.

The rotation direction setter 19 is configured to set the rotation direction of the motor 8 to a normal or opposite direction through the operation by the user, and is provided, in this embodiment, on the upper side of the trigger 18 as shown in FIG. 2. Rotating the motor 8 in the normal direction enables drilling of the work piece.

The control circuit 80 sets the command rotational speed of the motor 8 in accordance with a signal from the speed change commander 18*b*, and an upper limit rotational speed set through the upper-limit speed setter 96. In particular, the control circuit 80 sets the command rotational speed dependent on the amount of the operation (the operation rate) of the trigger 18 such that the rotational speed of the motor 8 reaches the upper limit rotational speed set by the upper-limit speed setter 96, when the trigger 18 is pulled to a maximum extent.

The control circuit 80 sets drive duty ratios for the switching devices Q1 to Q6 in accordance with the set command rotational speed and rotation direction to rotatively drive the motor 8 by outputting control signals based on the drive duty ratios to the drive circuit 72.

An LED 84 serving as a lighting (hereinafter referred to as "lighting LED 84") is provided in the front side of the motor housing 12. When the trigger switch 18*a* is turned on, the control circuit 80 turns on the lighting LED 84 to illuminate a portion of the work piece to be processed with the tool bit 4.

Rotational position sensors 81 are provided to the motor 8. The rotational position sensors 81 detect the rotational speed and rotational position of the motor 8 (to be specific, the rotational position of the rotation shaft 8A of the motor 8), and output detection signals to the motor controller 70.

The motor controller 70 includes a rotational position detection circuit 82. The rotational position detection circuit 82 detects the rotational position needed for setting the timing of energization of each phase winding in the motor 8, in accordance with detection signals from the rotational position sensors 81.

The motor controller 70 further includes a voltage detection circuit 78, a current detection circuit 74, and a temperature detection circuit 76.

The voltage detection circuit 78 detects the value of the battery voltage supplied from the battery pack 62. The current detection circuit 74 detects the value of the current flowing through the motor 8 via a resistor R1 provided in a current path to the motor 8.

The temperature detection circuit 76 detects a temperature of the motor controller 70.

The control circuit 80 receives detection signals from the voltage detection circuit 78, the current detection circuit 74, the temperature detection circuit 76, and the rotational position detection circuit 82, and detection signals from the twisted-motion detector 90.

The control circuit 80 restricts the rotational speed of the motor 8 that is being driven or stops drive of the motor 8, in accordance with detection signals from the voltage detection circuit 78, the current detection circuit 74, the temperature detection circuit 76, and the rotational position detection circuit 82.

The motor controller 70 includes a not-shown regulator for receiving electric power from the battery pack 62 and generating a constant power source voltage Vcc.

The power source voltage Vcc generated by the regulator is supplied to the MCU of the control circuit 80 and the acceleration detecting circuit 94 of the twisted-motion detector 90.

Alternatively, the twisted-motion detector 90 may include an additional regulator different from the regulator for supplying the power source voltage Vcc to the control circuit 80. This additional regulator may generate power source voltage Vcc2 for the twisted-motion detector 90. The twisted-motion detector 90 may receive voltage from the battery pack 62 directly or via the control circuit 80.

In addition, upon detection of twisting of the main body housing 10 from the acceleration along the X axis, the acceleration detecting circuit 94 outputs an error signal to the control circuit 80.

The error signal is designed to send a command to the control circuit 80 in the motor controller 70 to stop the motor 8. The control circuit 80 stops the drive of the motor 8 in response to the error signal. When the main body housing 10 is not twisted, the acceleration detecting circuit 94 outputs a no-error signal to the control circuit 80.

Upon detection of imposition of a load to the tool bit 4 from a vibration (i.e., acceleration) of the main body housing 10, the acceleration detecting circuit 94 outputs a load signal to the control circuit 80. The load signal indicates the fact that the tool bit 4 is placed in a load-imposed state.

When the acceleration detecting circuit 94 does not detect imposition of a load to the tool bit 4, the acceleration detecting circuit 94 outputs a no-load signal to the control circuit 80. The no-load signal indicates the fact that the tool bit 4 is placed in the no-load-imposed state.

The load signal and the no-load signal are used when the control circuit 80 drives the motor 8 in the low-speed rotation mode or in the high-speed rotation mode by the aforementioned soft-no-load control.

In other words, the control circuit 80 drives the motor 8 in the low-speed rotation mode in response to receiving the no-load signal from the acceleration detecting circuit 94. The low-speed rotation mode limits the rotational speed of the motor 8 to the no-load rotational speed (low rotational speed) or lower.

The control circuit 80 also drives the motor 8 in the high-speed rotation mode in response to receiving the load signal from the acceleration detecting circuit 94. In the high-speed rotation mode, the rotational speed of the motor 8 is in accordance with the command rotational speed, which is set depending on the amount of pulling operation of the trigger 18 and the operational position of the upper-limit speed setter 96.

Details of the acceleration-load detecting process executed by the MCU in the acceleration detecting circuit 94 is now explained with reference to the flowchart in FIG. 4.

Figure 4:
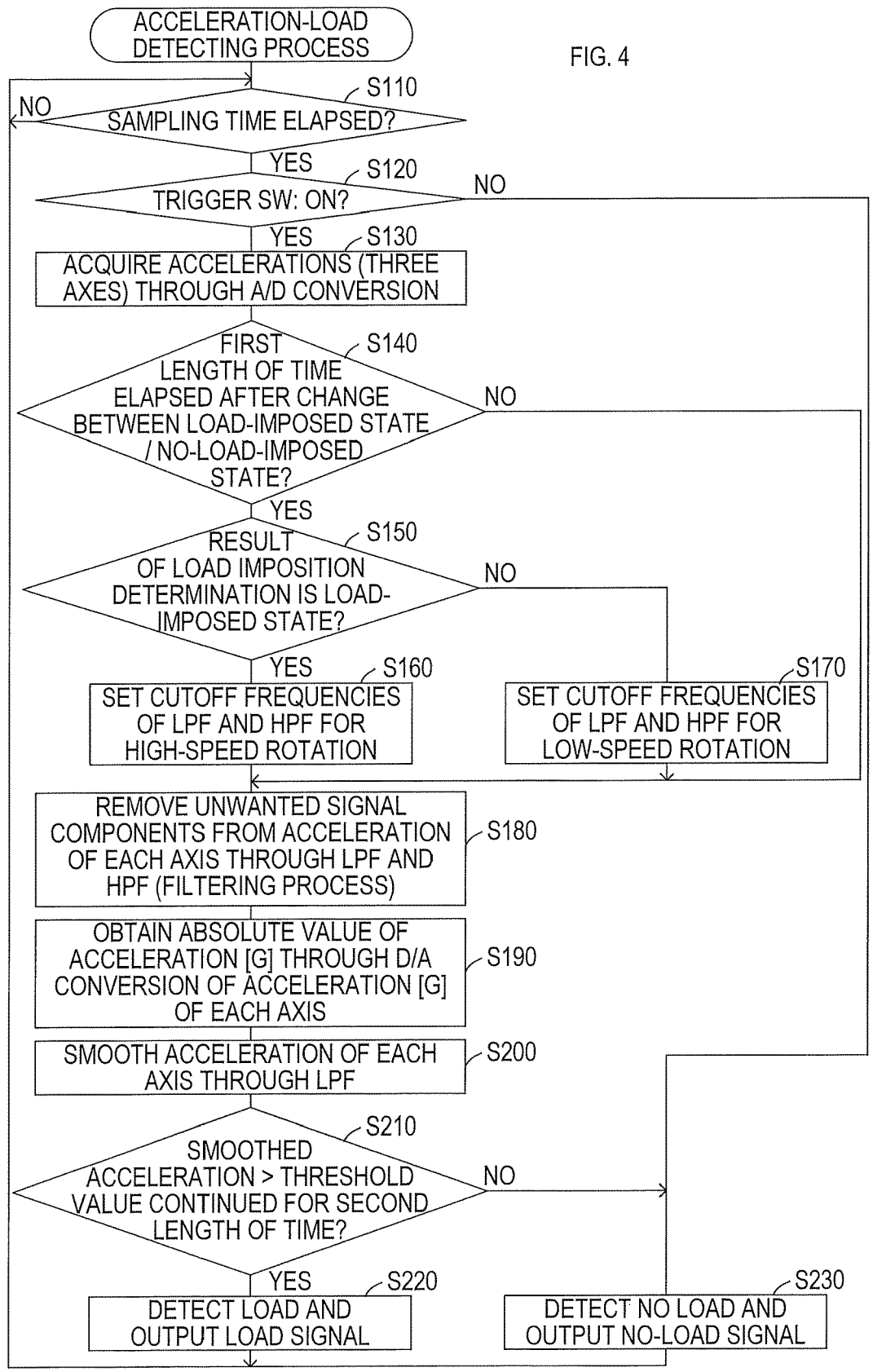
FIG. 4 is a flowchart showing an acceleration-load detecting process executed in an acceleration-detection circuit in a twisted-motion detector.

As shown in FIG. 4, in the acceleration-load detecting process, the MCU determines, in S110 (S means a step), whether a sampling time preset to determine load imposition to the tool bit 4 has elapsed. In other words, the acceleration detecting circuit 94 waits, in S110, until the preset sampling time to elapse since the process of S120 or processes of S120 and after are previously executed.

If it is determined in S110 that the sampling time has elapsed, the process proceeds to S120 and determines whether the trigger switch 18a is placed in an ON-state (i.e., whether the user has inputted a command for driving the motor 8).

If it is determined in S120 that the trigger switch 18a is placed in the ON-state, the process proceeds to S130 where accelerations, each of which corresponds to different one of the three axes (the X axis, the Y axis, and the Z axis), from the acceleration sensor 92 are converted from analog to digital (A/D conversion) and A/D converted accelerations are obtained. In the next S140, it is determined whether a preset first length of time has elapsed after the result of the load imposition determination performed in the subsequent processes has changed from the load-imposed state to the no-load-imposed state, or from the no-load-imposed state to the load-imposed state.

If it is determined in S140 that the first length of time has elapsed since the result the load imposition determination has changed, then the process proceeds to S150. If it is determined in S140 that the first length of time has not elapsed since the result of the load imposition determination has changed, then the process proceeds to S180.

In S150, it is determined whether the current result of the load imposition determination is the no-load-imposed state or the load-imposed state. If the current result is the load-imposed state, then the process proceeds to S160; if the current result is the no-load-imposed state, then the process proceeds to S170.

The processes in S160 and S170 set a cutoff frequency of a low-pass filter (LPF) and a cutoff frequency of a high-pass filter (HPF), which are used in a filtering process of acceleration data in S180, in accordance with the result of the load imposition determination.

More specifically, in S160, the result of the current load imposition determination is the load-imposed state and the motor 8 is driven in the high-speed rotation mode; thus the cutoff frequencies of the LPF and the HPF are each set to frequencies corresponding to the high-speed rotation (for example, LPF: 200 Hz, and HPF: 80 Hz).

In S170, the current result of the load imposition determination is the no-load-imposed state and the motor 8 is driven in the low-speed rotation mode with the upper limit speed being the no-load rotation speed; thus the cutoff frequencies of the LPF and the HPF are each set to frequencies corresponding to the low-speed rotation (for example, LPF: 100 Hz, and HPF: 30 Hz). The cutoff frequencies corresponding to the low-speed rotation are lower than the cutoff frequencies corresponding to the high-speed rotation.

In the subsequent S180, each acceleration data corresponding to the three axes (the X axis, the Y axis, and the Z axis) obtained in S130 is filtered with the LPF and HPF with the cutoff frequency set in S160 or S170 to remove unwanted signal components from each acceleration data.

The process in S180 serves a function as a bandpass filter (BPF) that extracts acceleration signals used for the load imposition determination. More specifically, in S180, the acceleration data is filtered with a digital filter that serves the functions of the LPF and the HPF, the cutoff frequency of which is lower than the LPF, as shown in FIG. 5.

Consequently, in the present embodiment, the process in S180 achieves a function of an example of the filter part of the present disclosure and extracts the acceleration signals within a frequency band between the cutoff frequency of the LPF and the cutoff frequency of the HPF.

The cutoff frequencies of the LPF and the HPF used in S180 are changed through the processes from S150 to S170 in accordance with the result of the load imposition determination. In a case where no load is imposed, which is when the motor 8 is driven in the low-speed rotation mode, the cutoff frequencies of the LPF and the HPF are set to frequencies lower than that in a case where a load is imposed, which is when the motor 8 is driven in the high-speed rotation mode.

Figure 5:
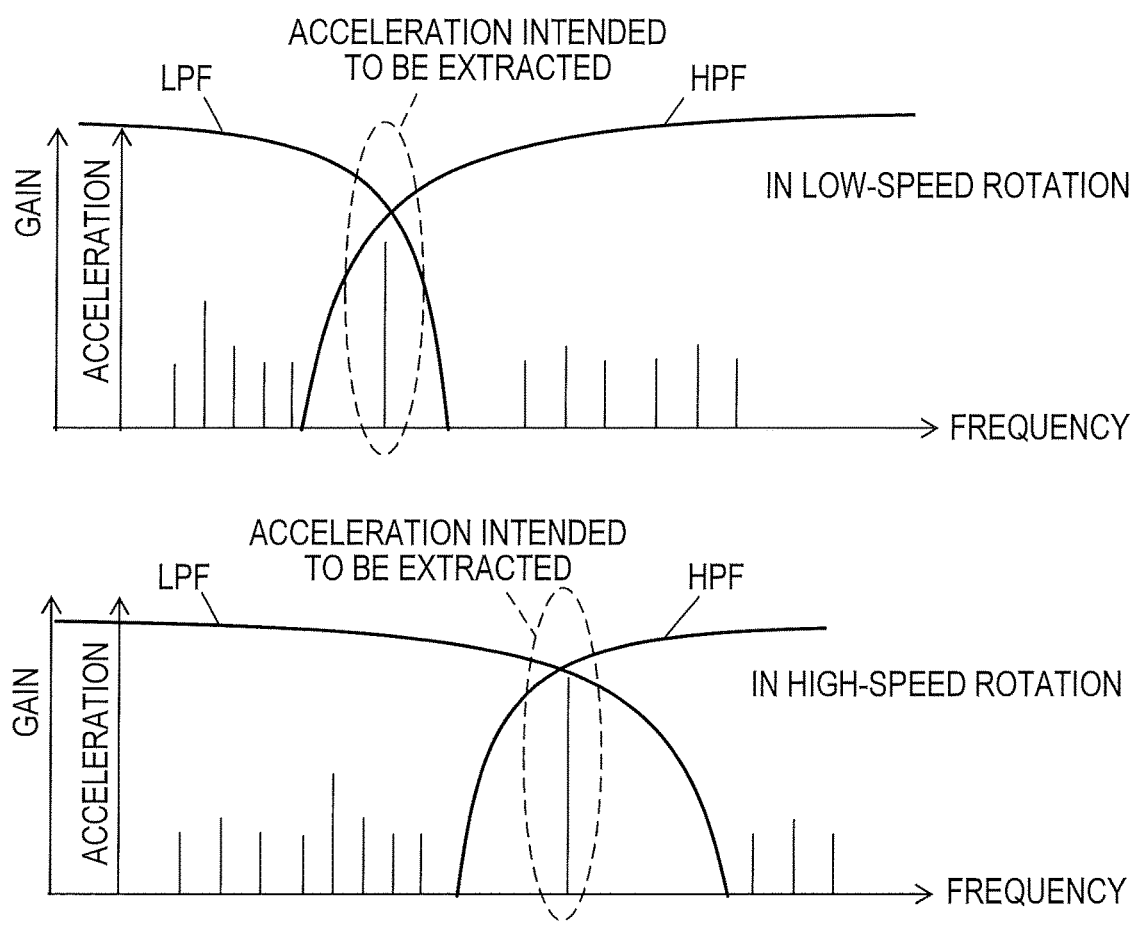
FIG. 5 is an explanatory diagram showing a filter property, a cutoff frequency of which is changed by the acceleration-load detecting process shown in FIG. 4.

The reason for this is that, as shown in FIG. 5, the frequency of the vibration generated by hammering differs in low speed rotation and in high speed rotation of the motor 8, and the frequency of the acceleration signals that should be extracted from the detection signals from the acceleration sensor 92 also differs likewise.

In other words, in the present embodiment, an appropriate extraction of the acceleration components used for the load imposition determination (i.e.; vibration components used for hammering determination) from the detection signals from the acceleration sensor 92 is enabled by setting the cutoff frequencies of the LPF and the HPF used in S180 as explained above. The processes from S130 to S170 function as one example of the filter-property setting part in the present disclosure.

The process proceeds to S190 after the acceleration data corresponding to each of the three axes are filtered in the filtering process in S180. In S190, the MCU converts the filtered acceleration data from digital to analog (D/A conversion) and obtains an absolute value of each accelerations [G] by, for example, full-wave rectifying the acceleration signals after the D/A conversion.

In the subsequent S200, the MCU obtains smoothed acceleration by smoothing the absolute values of the accelerations [G] corresponding to the three axes obtained in S190. The process then proceeds to S210.

In S210, the smoothed acceleration corresponding to each axis is compared with a threshold value preset for the load imposition determination to determine whether the smoothed acceleration corresponding to any one of the three axes continuously exceeds the threshold value for a second length of time or longer.

If it is determined in S210 that the smoothed acceleration corresponding to any one of the three axes continuously exceeds the threshold value for the second length of time or longer, then the MCU determines that the tool bit 4 is in the load-imposed state and the process proceeds to S220. In S220, the MCU outputs the load signal, which indicates that the tool bit 4 is in the load-imposed state, to the control circuit 80 and proceeds to S110.

If it is determined in S210 that the smoothed acceleration corresponding to any one of the three axes does not continuously exceed the threshold value for the second length of time or longer, or if it is determined in S120 that the trigger switch 18a is placed in the OFF-state, then the process proceeds to S230.

In S230, the MCU outputs the no-load signal to the control circuit 80 to notify the control circuit 80 that the tool bit 4 is in the no-load-imposed state and proceeds to S110.

By obtaining the load signal or the no-load signal outputted from the acceleration detecting circuit 94, the control circuit 80 is accordingly enabled to appropriately execute the aforementioned soft-no-load control.

The processes from S190 to S230 therefore functions as an example of the load-determiner in the present disclosure.

As explained above, in the hammer drill 2 in the present embodiment, functions as an example of the load-determiner, the filter part, and the filter-property setting part of the present disclosure are achieved by the execution of the acceleration-load detecting process by the acceleration detecting circuit 94 in the twisted-motion detector 90 as shown in FIG. 4.

In the processes as the filter-property setting part, from S130 to S170, the cutoff frequencies of the LPF and the HPF for the use in the process in S180, as the filter part, are set such that the frequencies are high in a case where load is imposed, which is when the motor 8 is driven in the high-speed rotation mode, compared with a case where no load is imposed, which is when the motor 8 is driven in the low-speed mode, based on the result of the load imposition determination obtained in the processes as the load-determiner from S190 to S230.

This enables the determination of the load imposition state to be still satisfactorily performed in the processes from S210 to S230 if the frequency of the vibration components included in the detection signal outputted from the acceleration sensor 92 is changed due to the change in rotational speed of the motor 8. Accordingly, the motor controller 70 can appropriately execute the soft-no-load control.

In addition, when changing the cutoff frequency of the LPF and the cutoff frequency of the HPF in the processes from S150 to S170, it is configured such that the change of the cutoff frequency is not enabled unless it is determined in S140 that the first length of time has elapsed after the result of the load imposition determination has changed.

Changes in the cutoff frequencies of the LPF and the HPF are therefore only enabled after (i) the result of the load imposition determination is changed, (ii) the rotation mode of the motor 8 is changed in the motor controller 70, and (iii) the rotational speed of the motor 8 is stabilized. This helps to reduce false execution of the load imposition determination when the cutoff frequency is changed.

In S210, the load imposition determination is performed based on a preset threshold value without changing the threshold value used for the load imposition determination. Thus, the load imposition determination can be easily performed.

Although one embodiment of the present disclosure has been described above, the electric working machine of the present disclosure is not limited to the aforementioned embodiment and may be modified in various forms.

For example, in the aforementioned embodiment, in S180, the filtering process as the BPF is described to be achieved by a combination of the LPF and the HPF. Nevertheless, unwanted vibration components may be removed by the filtering process as the LPF or the HPF.

In this case, in S160 and in S170, the cutoff frequency of the LPF or the HPF to be used in S180 may be set in the same manner as in the aforementioned embodiment.

Figure 6:
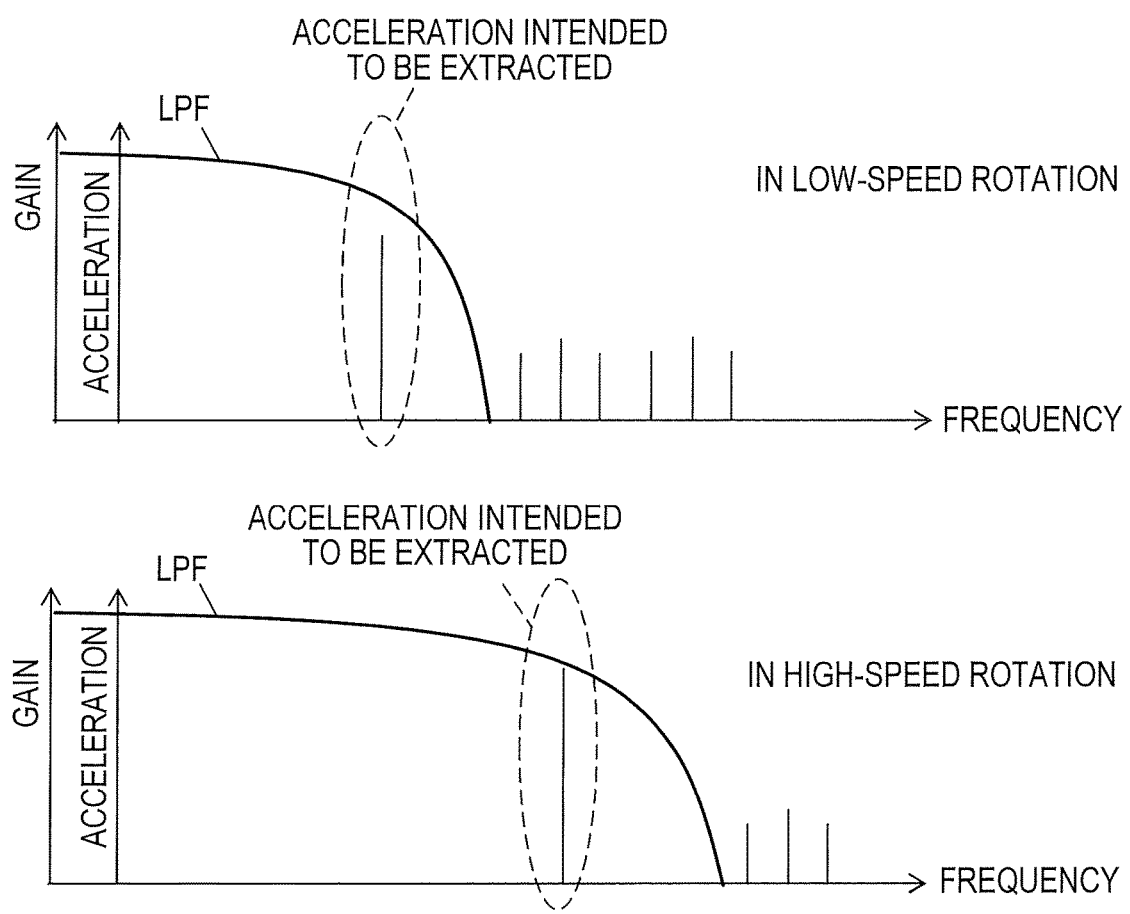
FIG. 6 is an explanatory diagram showing a first modified example of the filter property shown in FIG. 5.

In other words, as shown in FIG. 6, in a case where the filtering process as the LPF is performed in S180, the cutoff frequency of the LPF may be set to a frequency (for example, 200 Hz) corresponding to a high-speed rotation in S160; and the cutoff frequency of the LPF may be set to a frequency (for example, 100 Hz) corresponding to a low-speed rotation in S170.

Figure 7:
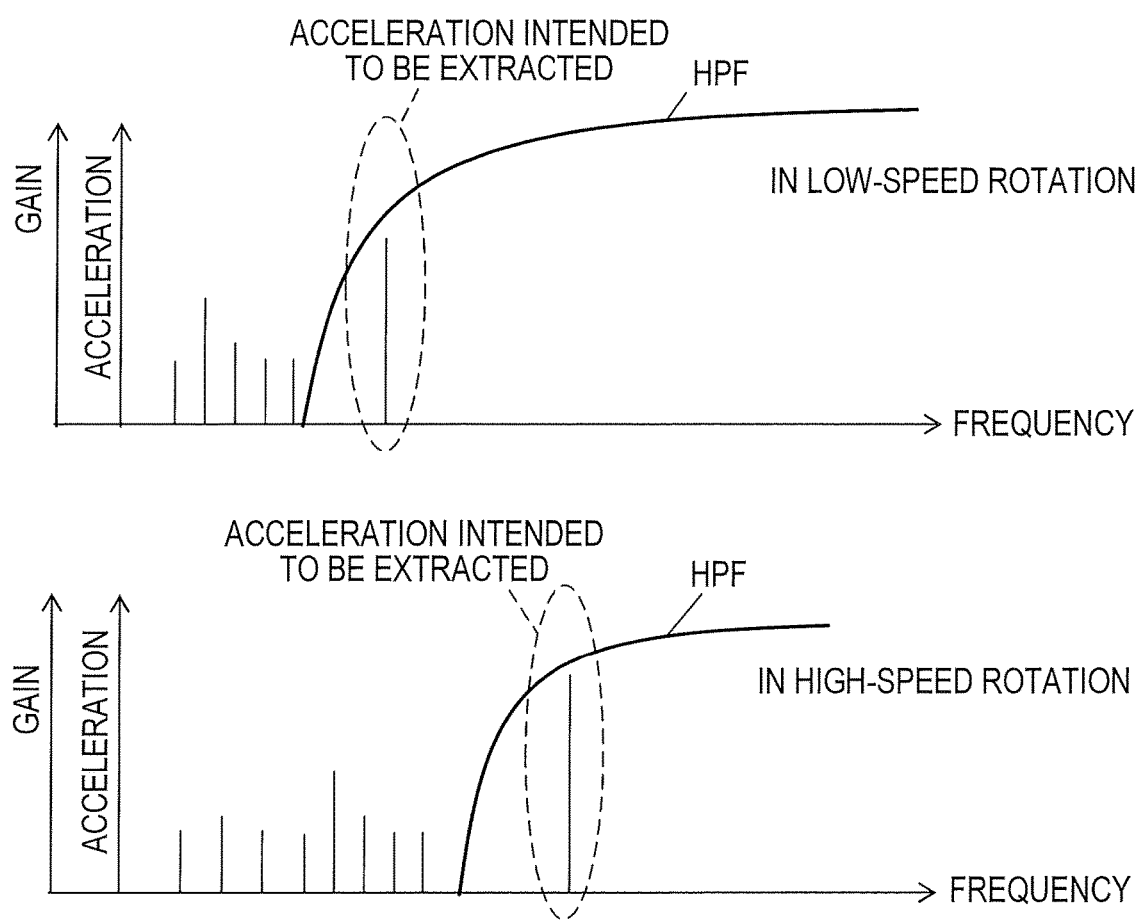
FIG. 7 is an explanatory diagram showing a second modified example of the filter property shown in FIG. 6.

As shown in FIG. 7, in a case where the filtering process as the HPF is performed in S180, the cutoff frequency of the HPF may be set to a frequency (for example, 80 Hz) corresponding to a high-speed rotation in S160. And, in S170, the cutoff frequency of the HPF may be set to a frequency (for example, 30 Hz) corresponding to a low-speed rotation.

In a case where the filtering process as the BPF is performed by a combination of the LPF and HPF in S180 as described in the aforementioned embodiment, the cutoff frequency of one of the LPF or the HPF may be fixed and the cutoff frequency of the other one may be changed as described above.

In S180 in the aforementioned embodiment, an example of the filter part of the present disclosure is achieved as a digital filter by performing the filtering process as the LPF and the HPF. Nevertheless, the filter part may include two or more analog filters. In this case, the cutoff frequency may be changed by selecting an analog filter to use with a switch. Also in this case, characteristics of elements (such as capacitors and coils) included in the analog filter(s) may be changed.

In the aforementioned embodiment, it is explained that all of the acceleration signals corresponding to the three axes (X, Y, and Z axes) detected by the acceleration sensor 92 are used in the acceleration-load detecting process. Nevertheless, in the hammer mode (hammer drill mode), imposition of load (initiation of work) may be detected based mainly on the acceleration signal corresponding to the Z axis.

In the aforementioned embodiment, an example was given with respect to the hammer drill 2 that performs in a rotational motion and a hammering motion. Nevertheless, the present disclosure may be applied to any and all electric working machines that can change a rotational speed (more specifically, the upper limit of the rotational speed) of a motor between a case where the motor is driven in a no-load-imposed state and a case where a motor is driven in a load-imposed state, and determine the load-imposed state based on a vibration detected by an acceleration sensor.

Specific example applications of the technique of the present disclosure include electric hammering tools such as an impact driver, and electric cutting tools such as a jigsaw and a reciprocating saw. These examples can attain the same effect as explained in the aforementioned embodiment.

In addition, two or more functions of one element in the aforementioned embodiment may be achieved by two or more elements; or one function of one element in the aforementioned embodiment may be achieved by two or more elements. Likewise, two or more functions of two or more elements may be achieved by one element; or one function achieved by two or more elements may be achieved by one element. A part of the configuration of the aforementioned embodiment may be omitted; and at least a part of the configuration of the aforementioned embodiment may be added to or replaced with another part of the configuration of the aforementioned embodiment. It should be noted that any and all modes that are encompassed in the technical ideas that are defined only by the languages in the claims are embodiments of the present disclosure.

What is claimed is:

1. An electric working machine comprising:
   a tool holder configured for an attachment to a tool bit;
   a motor including a rotational shaft and configured to rotationally drive the rotational shaft;
   a movement converter configured to convert a rotation of the rotational shaft to a rotational movement and/or a reciprocating movement of the tool holder;
   an acceleration sensor configured to detect a vibration of the electric working machine and to output a detection signal that corresponds to the vibration;
   a load-determiner configured to determine whether a load is imposed on the tool bit based on the detection signal inputted from the acceleration sensor, the load-determiner being configured to drive the motor in a low-speed rotation mode in response to a determination by the load-determiner that no load is imposed on the tool bit, the load-determiner further being configured to drive the motor in a high-speed rotation mode in response to a determination by the load-determiner that a load is imposed on the tool bit, and a rotational speed of the motor in the high-speed rotation mode being higher than a rotational speed of the motor in the low-speed rotation mode;
   a filter part having a cutoff frequency and configured to change the cutoff frequency, the filter part being configured to remove, based on the cutoff frequency, an unwanted signal component from the detection signal outputted from the acceleration sensor, the filter part further being configured to input, to the load-determiner, the detection signal with the unwanted signal component removed, and the unwanted signal component corresponding to a vibration of the electric working machine unnecessary for a determination by the load-determiner; and
   a filter-property setting part configured to change the cutoff frequency of the filter part such that the cutoff frequency in the high-speed rotation mode is higher than the cutoff frequency in the low-speed rotation mode in response to the motor being driven in the high-speed rotation mode.

2. An electric working machine comprising:
   a motor;
   an acceleration sensor configured to detect a vibration of the electric working machine and output a detection signal corresponding to the vibration;
   a load-determiner configured to determine whether the electric working machine is placed in no-load-imposed state or in load-imposed state based on the detection signal from the acceleration sensor, the load-determiner being configured to drive the motor in a low-speed rotation mode in response to a determination by the load-determiner that the electric working machine is placed in the no-load-imposed state, and the load-determiner being further configured to drive the motor in a high-speed rotation mode in response to a determination by the load-determiner that the electric working machine is placed in the load-imposed state;
   a filter part having a cutoff frequency, the filter part being configured to remove, based on the cutoff frequency, an unwanted signal component from the detection signal outputted from the acceleration sensor, the filter part being further configured to input, to the load-determiner, the detection signal with the unwanted signal component removed, and the unwanted signal component corresponding to a vibration of the electric working machine unnecessary for a determination by the load-determiner; and
   a filter-property setting part configured to change the cutoff frequency of the filter part such that the cutoff frequency in the high-speed rotation mode is higher than the cutoff frequency in the low-speed rotation mode.

3. The electric working machine according to claim 2, wherein the filter part includes a high-pass filter.

4. The electric working machine according to claim 3, wherein the filter-property setting part is configured to change the cutoff frequency of the high-pass filter such that the cutoff frequency in the high-speed rotation mode is higher than the cutoff frequency in the low-speed rotation mode.

5. The electric working machine according to claim 2, wherein the filter part includes a low-pass filter.

6. The electric working machine according to claim 5, wherein the filter-property setting part is configured to change the cutoff frequency of the low-pass filter such that the cutoff frequency in the high-speed rotation mode is higher than the cutoff frequency in the low-speed rotation mode.

7. The electric working machine according to claim 2, wherein the filter part includes a low-pass filter, and a high-pass filter, and
   wherein the filter part is configured to reduce signal transmission loss within a frequency band between a cutoff frequency of the low-pass filter and a cutoff frequency of the high-pass filter.

8. The electric working machine according to claim 7, wherein the filter-property setting part is configured to change the cutoff frequency of the low-pass filter and/or the cutoff frequency of the high-pass filter such that the cutoff frequency in the high-speed rotation mode is higher than the cutoff frequency in the low-speed rotation mode.

9. The electric working machine according to claim 2, wherein, the detection signal has a voltage value, and
   wherein the load-determiner is configured to compare the voltage value of the detection signal, inputted through the filter part, with a predefined threshold value.

10. The electric working machine according to claim 9, wherein the load-determiner is configured to determine that the electric working machine is placed in the load-imposed state if the voltage value of the detection signal is greater than the threshold value.

11. The electric working machine according to claim 2, wherein the filter-property setting part is configured to change the cutoff frequency of the filter part in response to an elapse of a given length of time since a rotation mode of the motor is changed by the load-determiner.

12. A method for determining a load-imposed state and controlling a motor of an electric working machine, the method comprising:
    outputting a detection signal corresponding to a vibration of the electric working machine from an acceleration sensor arranged in the electric working machine;
    removing an unwanted signal component from the detection signal through a filter having a changeable cutoff frequency, the unwanted signal component corresponding to a vibration unnecessary for a determination of the load-imposed state of the electric working machine;

changing the cutoff frequency of the filter such that the cutoff frequency in a high-speed rotation mode of the motor included in the electric working machine is higher than the cutoff frequency in a low-speed rotation mode of the motor;

determining whether the electric working machine is placed in the load-imposed state based on the detection signal with the unwanted signal component removed; and driving the motor in the low-speed rotation mode in response to a determination that the electric working machine is placed in a no-load-imposed state, and driving the motor in the high-speed rotation mode in response to a determination that the electric working machine is placed in the load-imposed state.

* * * * *